US009934620B2

(12) United States Patent
Byrd, Jr.

(10) Patent No.: US 9,934,620 B2
(45) Date of Patent: Apr. 3, 2018

(54) SYSTEM AND METHOD FOR CROWD SOURCING AIRCRAFT DATA COMMUNICATIONS

(71) Applicant: Thomas R. Byrd, Jr., Doral, FL (US)

(72) Inventor: Thomas R. Byrd, Jr., Doral, FL (US)

(73) Assignee: Alula Aerospace, LLC, Miami, FL (US)

( * ) Notice: Subject to any disclaimer, the term of this patent is extended or adjusted under 35 U.S.C. 154(b) by 14 days.

(21) Appl. No.: 15/130,951

(22) Filed: Apr. 16, 2016

(65) Prior Publication Data

US 2017/0178420 A1 Jun. 22, 2017

Related U.S. Application Data

(60) Provisional application No. 62/271,080, filed on Dec. 22, 2015.

(51) Int. Cl.
*G01M 17/00* (2006.01)
*G07C 5/00* (2006.01)
*G07C 5/08* (2006.01)

(52) U.S. Cl.
CPC ........... *G07C 5/008* (2013.01); *G07C 5/0808* (2013.01); *G07C 5/0841* (2013.01)

(58) Field of Classification Search
CPC .... G07C 5/008; G07C 5/0808; G07C 5/0841; G07C 5/085; G01M 17/007; G06Q 10/06
USPC ................. 701/31.5, 3, 14, 29, 528; 342/36; 700/26; 340/439, 945
See application file for complete search history.

(56) References Cited

U.S. PATENT DOCUMENTS 4,729,102 A 3/1988 Miller, Jr. et al.
5,696,903 A 12/1997 Mahany
5,890,079 A 3/1999 Levine
6,009,356 A * 12/1999 Monroe ............. B64D 45/0015 340/439

(Continued)

FOREIGN PATENT DOCUMENTS

WO WO2014/051796 4/2014

OTHER PUBLICATIONS

Obi Orjih, "Recent Developments in Aircraft Wireless Networks," <http://www.cse.wustl.edu/~jain/cse574-06/ftp/aircraft_wireless>, dated Apr. 23, 2006, printed on Jun. 19, 2017.

(Continued)

*Primary Examiner* — Shardul D Patel
(74) *Attorney, Agent, or Firm* — Hanrahan Law Firm, P.A.; Benjamin M. Hanrahan

(57) ABSTRACT

To facilitate wireless, near real time, in-flight data collection this system and method presents a solution to universal aircraft data transmission and retrieval. The subject apparatus and corresponding system will be capable of universally integrating into thousands of aircraft globally regardless of type, model or series: an affordable alternative method of streaming critical flight data parameters in near real-time. This service will benefit maintenance providers, airports, aircraft lessors, airlines, airline operations centers, and government agencies such as the FAA, NTSB, and NWS, etc. The subject system, method and apparatus will not replace current aircraft flight data recorder systems, but rather integrate into them and enhance their capabilities while reducing the costs industry-wide.

18 Claims, 10 Drawing Sheets

(56) References Cited

U.S. PATENT DOCUMENTS

| | | | | |
|---|---|---|---|---|
| 6,154,637 | A | 11/2000 | Wright et al. | |
| 6,163,681 | A | 12/2000 | Wright et al. | |
| 6,308,045 | B1 * | 10/2001 | Wright | G05D 1/0055 340/945 |
| 6,745,010 | B2 | 1/2004 | Wright et al. | |
| 6,735,505 | B2 | 5/2004 | Levine | |
| 7,053,797 | B2 | 5/2006 | Taylor | |
| RE40,479 | E | 9/2008 | Wright et al. | |
| 7,612,716 | B2 | 11/2009 | Smith et al. | |
| 7,668,632 | B2 * | 2/2010 | Vian | G07C 5/085 700/26 |
| 7,974,745 | B2 * | 7/2011 | Fok | G06Q 40/08 342/36 |
| 8,244,414 | B2 * | 8/2012 | Fok | G08G 5/0043 701/3 |
| 8,589,994 | B2 | 11/2013 | Monroe | |
| 8,744,372 | B2 | 6/2014 | Ziarno et al. | |
| 8,963,776 | B2 | 2/2015 | Baker et al. | |
| 9,003,052 | B2 | 4/2015 | Holstein et al. | |
| 9,126,696 | B1 | 9/2015 | Hampel et al. | |
| 2003/0135311 | A1 * | 7/2003 | Levine | B64D 45/00 701/33.4 |
| 2003/0225492 | A1 | 12/2003 | Cope et al. | |
| 2004/0086121 | A1 | 5/2004 | Viggiano et al. | |
| 2006/0040612 | A1 | 2/2006 | Min | |
| 2008/0102812 | A1 * | 5/2008 | Chari | H01Q 1/283 455/424 |
| 2008/0117858 | A1 | 5/2008 | Kauffman | |
| 2009/0133112 | A1 | 5/2009 | Kauffman et al. | |
| 2010/0073197 | A1 * | 3/2010 | Eagleton | G07C 5/008 340/945 |
| 2010/0152962 | A1 | 6/2010 | Bennett et al. | |
| 2011/0125348 | A1 * | 5/2011 | Sandell | G07C 5/008 701/14 |
| 2012/0010806 | A1 * | 1/2012 | Tseng | G01C 21/00 701/528 |
| 2013/0158751 | A1 | 6/2013 | Cornell et al. | |
| 2014/0074345 | A1 | 3/2014 | Gabay et al. | |
| 2015/0203212 | A1 | 7/2015 | Zubairi | |
| 2016/0257429 | A1 * | 9/2016 | Szeto | G07C 5/008 |

OTHER PUBLICATIONS

Marisa Garcia, Skift, "The Aircraft Tracking System of the Future Was Built on Link Bait," <http://skift.com/2015/05/04/link-bait-helped-a-swedish-site-crowdsource-the-aircraft-tracking-system-aviation-cant-afford/>, dated May 4, 2015, printed on Jan. 14, 2016.

Scott Mccartney, "Who Knows Where Almost Every Flight Is Right Now?," The Wall Street Journal, <http://www.wsj.com/articles/the-men-who-know-where-every-flight-is-1440610114>, dated Aug. 26, 2015, printed on Jan. 14, 2016.

* cited by examiner

SYSTEM AND METHOD FOR CROWD SOURCING AIRCRAFT DATA COMMUNICATIONS

CLAIM OF PRIORITY/CROSS REFERENCE TO RELATED APPLICATION

The present application is based on and a claim to priority is made under 35 U.S.C. § 119(e) to provisional patent application Ser. No. 62/271,080, having a filing date of Dec. 22, 2015, the contents of which are incorporated herein their entirety by reference.

FIELD OF THE INVENTION

This disclosure generally pertains to the facilitation of, via an aircraft integrated apparatus, wireless in-flight aircraft data streaming through a primary means of crowd sourced receivers. More particularly, the present disclosure focuses on a physical device that in one aspect may be installed in an aircraft that will draw or otherwise receive critical and other flight data from the digital flight data recorder (DFDR) system, for example, and broadcast or transmit the data in near real time utilizing at least one, and in some cases, multiple means of transmission. This solution will enable the aviation industry a new ability to stream aircraft diagnostic data from aircraft during flight utilizing a cost efficient and effective means of communication.

BACKGROUND OF THE INVENTION

Historically, information accumulated by the aircraft data acquisition equipment receives input from a variety of transducers and/or sensors throughout aircraft, which ultimately provide digital and analog data based on the outputs of the sensors. This stored information often goes unaccounted for and is deleted following the completion of a successful flight. If collected at all, it is often collected and analyzed post flight or post incident. The integrity of this data is at the mercy of the box in which it is stored. In the event of a catastrophic failure during flight, it is up to the geographical location of the plane where it crashed to find the digital flight data recorder (DFDR) in order to retrieve the critical information used for investigation purposes. Furthermore, it is reliant on the integrity of the box (DFDR) post-incident to provide the data for interrogation and analysis. This serves no purpose when providing initial life saving measures or search and rescue efforts in obscure locations around the world (e.g. north Atlantic, Pacific, etc.).

In 1995, the Federal Aviation Administration (FAA), in an attempt to remedy this situation, recommended that collected flight data be reviewed in regular intervals. Another proposed solution was to download aircraft data at the gate via wireless ground link using a quick access recorder (QAR). The current avenues to stream flight data in real time are limited to only a few prohibitively expensive means; primarily via satellite communications (SATCOM) and/or very high frequency (VHF) radio frequency (RF) receivers using the aircraft communications addressing and reporting system (ACARS) messaging system. In the art, an enormous challenge to facilitate affordable in-flight streaming data has been the means by which to accumulate and disseminate the data in real time or near real time at a reasonable cost. The present application seeks to address one or all of the above issues.

SUMMARY OF THE INVENTION

It has been recognized that it would be advantageous to receive aircraft data prior to catastrophic termination of flight allowing immediate life saving measures, search and rescue efforts, and accident investigations to take place.

It has also been recognized that receiving aircraft diagnostic data while in flight will aid in a quicker identification of possible aircraft component malfunctions, allowing a more rapid response to finding the source of these malfunctions and ultimately the source of the issue(s).

It has also been recognized that receiving the aircraft diagnostic data following normal termination of flight enables the industry to predictively provide maintenance to components prior to catastrophic failure, and further enable the growing aircraft health management (AHM) industry.

It has also been recognized that receiving meteorological data derived from digital flight data recording (DFDR) systems will add value to the aviation community in terms of aircraft routing and improving aircraft efficiency and safety.

It has also been recognized that receiving the aircraft diagnostic data at a relatively affordable cost will enable all of the aforementioned activities.

In accordance with certain embodiments disclosed herein, the present invention facilitates a universal wireless in-flight data streaming system. The apparatus, for example, an On-board Communications Hub, may be installed in almost any type, model, or series (T/M/S) of aircraft. This device or hub will collect data the customer or end user deems critical, and transmit it to various receivers, primarily crowd sourced ground receivers, among others, to be further disseminated and scrutinized. The On-board Communications Hub (OCH) of some embodiments may require physical integration into the flight data recording system, the aircraft electronics system, and/or the addition of an ATC/L-B and or other like antenna. Some embodiments, however, may be implemented via wireless communication with the DFDR, aircraft electronics system, and/or an ATC/L-B and or other like antenna.

The system and method of certain embodiments of the present invention may require the aircraft to be equipped with a standard flight data recorder system. Additionally, as described herein, the system and method of some embodiments may benefit from the presence of a SATCOM transmission capability on the aircraft. The compiled data may be broadcasted using various pre-assigned ultra-high frequency (UHF) channels in order to mitigate overwhelming congestion on a single frequency.

In accordance with another aspect thereof, this device contains the ability for the unit to utilize the full spectrum of broadcast capability available in one single unit (e.g. UHF, SATCOM, Bluetooth, and/or Wi-Fi) to wirelessly broadcast aircraft data.

In accordance with another aspect thereof, data will be routed to the servers or computer systems of an Operations Center (OC), and finally to end-user(s) to serve a variety of uses for the aviation industry as a whole. Ultimately this device will save the public costs for travel while increasing safety.

In accordance with another aspect thereof, the primary means of receiving transmitted data communications will be crowd sourced aviation enthusiasts willing to utilize their provided receiver hardware and software to form a global network for an air to ground (ATG) communication infrastructure.

In another embodiment, the OCH will integrate into the in-flight entertainment (IFE) system via WiFi. This will allow flight data to be transmitted utilizing the aircraft's in flight WiFi service, e.g., the WiFi service that may have been originally optimized for customer use. The means in which the aircraft will provide in flight WiFi may vary (e.g. SATCOM, or air to ground). The means in which the OCH will connect to the on board WiFi routers will largely remain the same. Following broadcast of parameters from the aircraft using this method, the data will be sent to the OC using standard Internet protocol.

In another embodiment, the OCH will utilize SATCOM to transmit in the event of an emergency. This prompt to immediately broadcast bulk data will be given either from the OC, or from the device itself, e.g., the OCH, if incited by the exceedance of pre-specified sensors outputs.

In another embodiment, the OCH will utilize SATCOM to transmit at the discretion of the end-user(s).

In another embodiment, the OCH will integrate with the electronic flight bag (EFB) of aircrew and broadcast messages and/or data across the various means of communication available to the OCH as required.

In yet another embodiment, following landing, taxi, and parking at the terminal/gate, the aircraft equipped with the OCH apparatus will automatically download, receive and/or transmit flight crew information and the remainder of the flight data not broadcasted during flight via Bluetooth/Wi-Fi receivers.

These and other objects, features and advantages of the present invention will become more apparent when the drawings as well as the detailed description are taken into consideration.

BRIEF DESCRIPTION OF THE DRAWINGS

Additional feature; and advantages of the invention will be apparent from the detailed description which follows, taken in conjunction with the accompanying drawings, which together illustrate, by way of example, features of the invention, and wherein.

Like reference numerals refer to like parts throughout the several views of the drawings provided herein.

DETAILED DESCRIPTION OF THE INVENTION

Figure 1:
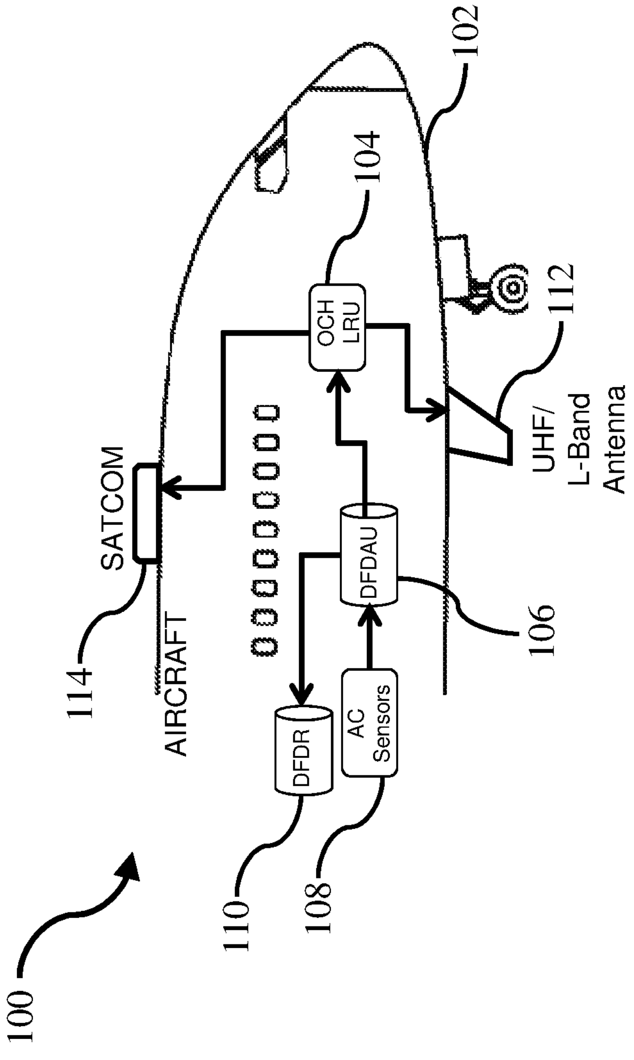
FIG. 1 illustrates a non-limiting structural diagram of aircraft including primary components of the subject apparatus, i.e., OCH LRU, integrated in accordance with at least one embodiment of the present disclosure.

As shown in the accompanying drawings, certain embodiments of the present invention are directed to a system and method for crowd sourcing aircraft data communications. For instance, in the present disclosure provided herein are certain embodiments including a universal apparatus, such as an on-board communications hub ("OCH") that can be integrated into existing aircraft to facilitate in-flight streaming data, which utilizes, primarily current global crowd sourcing receiver communities.

The embodiments disclosed below are not intended to be exhaustive or limit the disclosure to the precise forms disclosed in the following detailed description. Rather, the embodiments are chosen and described so that others skilled in the art may utilize their teachings. Accordingly, the principle features of the invention can be disclosed in multiple embodiments without departing from the scope of the present invention.

Furthermore, every feature and embodiment disclosed and claimed has the ability to be made without undue experimentation in light of what is disclosed herein. Substitutes, modifications or alternative arrangement of the invention is apparent to those skilled in the art are within the scope of the invention as defined by the claims. Some features and embodiments may be described as preferred, it is apparent to those skilled in the art that variations to certain embodiments may be applied without departing from the scope or concept of the invention.

To assist in understanding the disclosed invention certain terms are defined below. The terms defined have common meanings understood by those of ordinary skill in the art. The terminology included illustrates specific embodiments, but does not delimit the invention, except as outline in the claims.

The term "or combination thereof" is used refers to all permutations and combinations of the listed items preceding the term. For instance, "A, B, C, or combinations thereof" is intended to include at least one of the following: AB, BC, ABC, A, B, C, BA, CA, CB, CBA, BCA, ACB, BAC, or CAB. Furthermore, combinations that contain repeats of one or more item such as MB, BB AAA, BBC, CCABBBB, ACCBBB, ABCBAA, etc. A person skilled in the art will understand that typically there in no limit on the number of items or terms in any combination, unless specifically defined or from context.

The words "having" (and any form of having: has, have, etc.), "including" (and any form of including: include, includes, etc.) or "containing" (and any form of containing: contains, contain, etc.) are open-ended or inclusive and do not exclude additional, method steps or elements not mentioned.

Throughout the application "a" or "an" used in conjunction with the term "comprising" in the specification and/or claims may mean "one", "one or more" "one or more than one" and "at least one". The term "about" is used to indicate a value includes the method being employed to determine a value, the inherent variation or error for the device or the variation that exists among the when comparing subjects. Additionally, the term "or" in the claims is used to mean "and/or" unless explicitly indicated to refer to alternatives only or the alternatives are mutually exclusive, although the disclosure supports a definition that refers to alternatives only and "or/and".

The term "line replaceable unit" or "LRU" refers to a modular component of an aircraft designed to be replaced quickly at an operating or maintenance location. An LRU is usually a sealed unit such as a radio or other auxiliary equipment often found in the aircraft's equipment/avionics bay.

Figure 2:
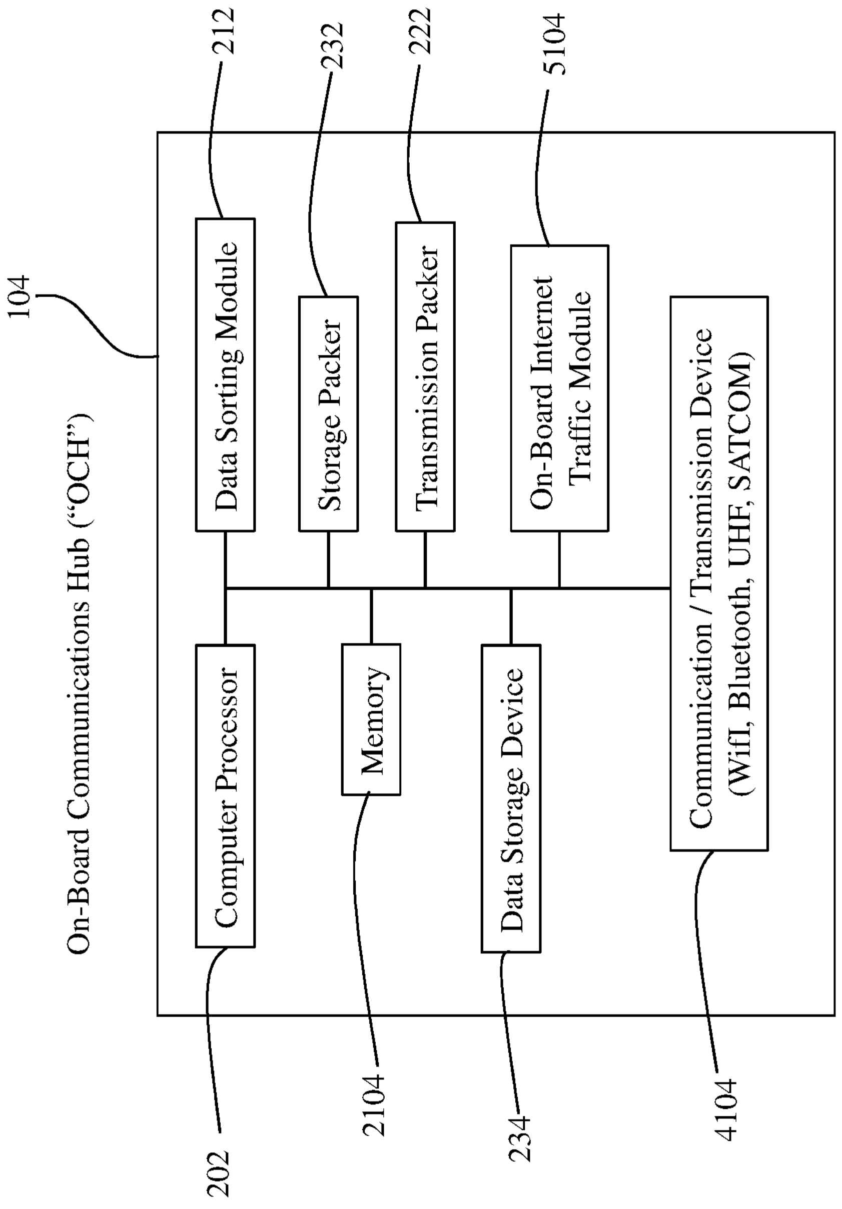
FIG. 2 is a block diagram of at least one embodiment of the OCH LRU as disclosed herein.

The terms "On-board Communications Hub," "OCH," "On-Board Communications Hub LRU," or OCH LRU," generally referenced as 104 in FIG. 1, refers to the subject matter apparatus, which is many embodiments may be universal to any T/M/S aircraft and can be integrated into the existing avionic equipment/avionics bay to enhance the wireless data communication capabilities of that aircraft providing an affordable solution to real time or near real time flight data streaming. Further, the OCH 104 of at least one embodiment may include any one or more computer based systems structured to receive, store, communicate and/or process data in accordance with the present invention. As shown in the schematic of FIG. 2, the OCH 104 may therefore include a computer processor 202, memory 2104, one or more data storage devices 234, and one or more communication devices or hardware 4104 (e.g., UHF transmission device, SATCOM, WiFi, Bluetooth, etc.)

Figure 4A:
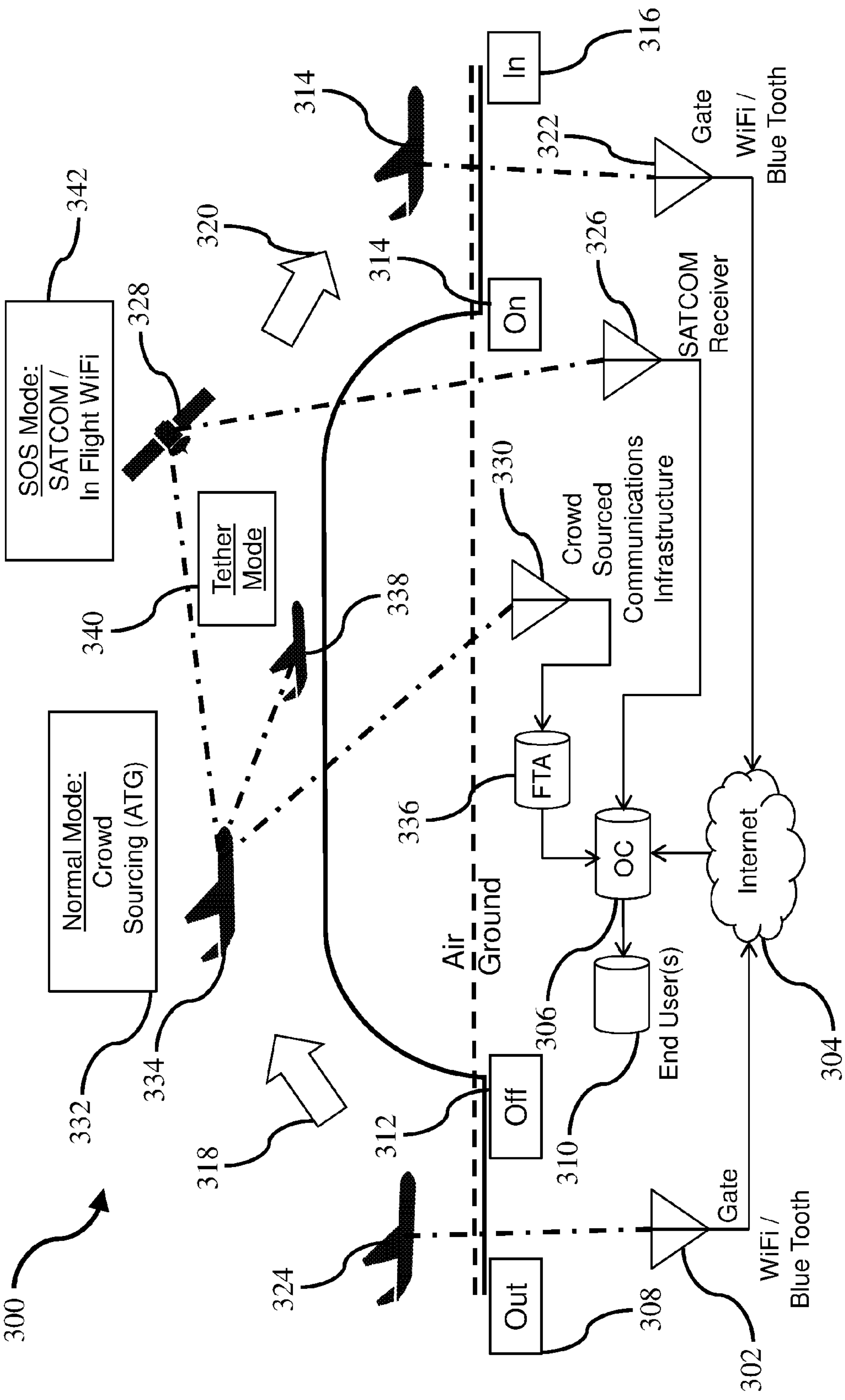
FIG. 4A illustrates a non-limiting functional diagram of one embodiment of the present invention as a holistic system showing the temporal relationships of the individual components of the embodiment throughout the various phases of the flight sequence.
Figure 5:
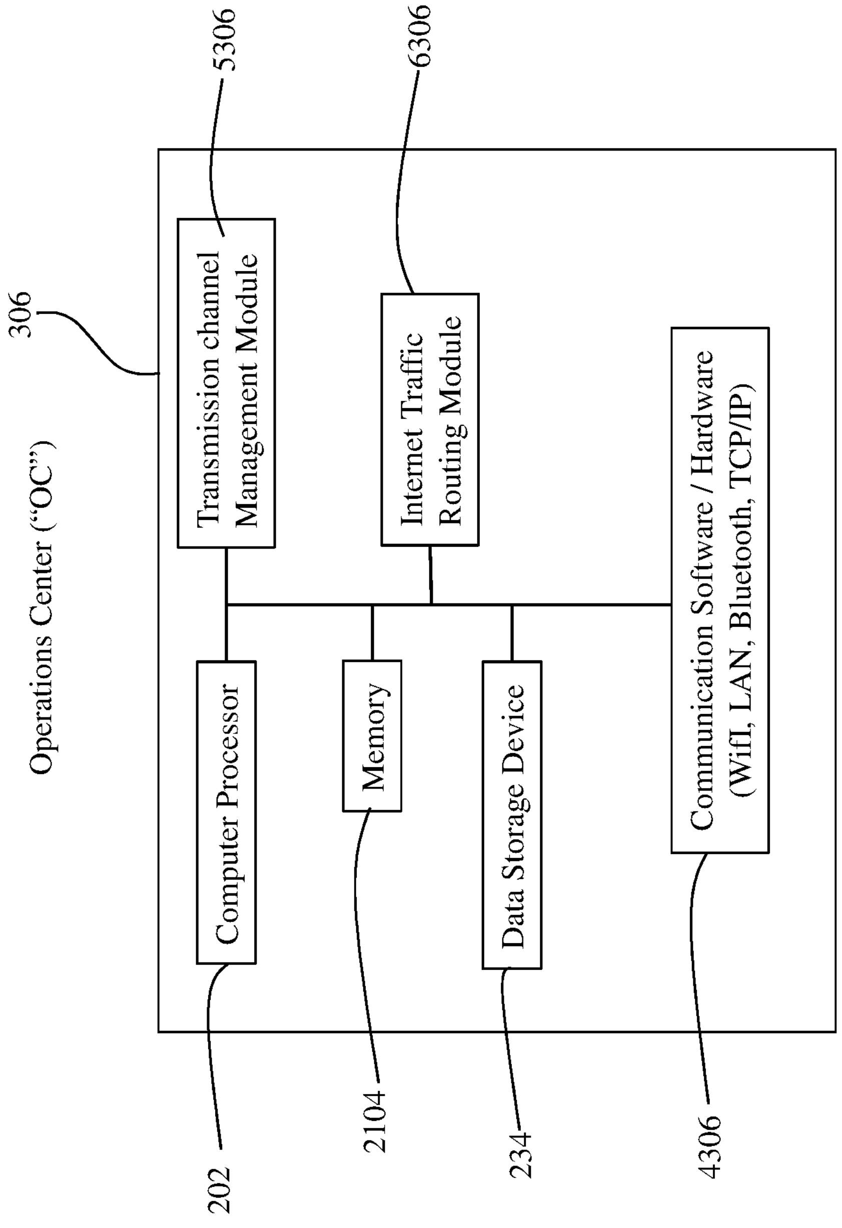
FIG. 5 is a block diagram illustrating the operations center ("OC") in accordance with at least one embodiment of the present invention.

The term "Operation Center" or "OC," generally referenced as 306 in FIG. 4A, refers to a location where streaming flight data and ground bulk data is routed for scaling and tailoring prior to dissemination to end user(s). Further, the OC 306 of at least one embodiment may include any one or more computer systems structured to receive, store, communicate and/or process data in accordance with the present invention. As shown in the schematic of FIG. 5, the OC may therefore include a computer processor 1306, memory 2306, one or more data storage devices 3306, and one or more communication devices or hardware 4306 (e.g., network device(s), web server(s), etc.) Accordingly, the OC 306 of at least one embodiment may comprise one or more web servers or data servers, including software and hardware configured to receive requests and to communicate data, information, media, web pages, applications, etc. in accordance with the present invention.

The term "crowd sourcing" refers to the process of obtaining needed services, ideas, or content by soliciting contributions from a large group of people, and especially from an online community, rather than from traditional employees or suppliers.

The term "flight tracker app," or "FTA" refers to a crowd sourced aviation software entity, or application and services company enabling crowd sourced receiver communities. This could be an organic capability of the embodiment system, or provided by a third party partnership. This entity may service the aviation industry by providing aircraft telemetry information it collects from its infrastructure of crowd sourcing aviation enthusiasts. These enthusiasts collect this data by receiving aircraft data across the UHF spectrum using either homemade or a provided receiver antenna. In some embodiments, this service may be modified and optimized to receive data from the OCH LRU 104 in order to facilitate the new system embodiment disclosed herein.

The term "end-user" refers to the customers served by the aircraft data communications system. These end users and their incentive for receiving the output, or service as a result of this system will vary according to their position.

The term aircraft/airplane health monitoring "AHM" refers to the ability to help effectively assess aircraft component failure events in real-time. The structural health monitoring of an aircraft is a new concept, and is becoming one of the key enabling technologies used to ensure integrity of an aircraft fleet.

The term "FAA" refers to the Federal Aviation Administration.

The term "NTSB" refers to the National Transportation Safety Board.

The term "NWS" refers to the National Weather Service.

The term "NOAA" refers to the National Oceanic and Atmospheric Administration.

The term "FCC" refers to the Federal Communications Commission.

The term "DFDR" refers to the digital flight data recorder. This device records various performance parameters of an aircraft; especially one designed to survive an impact and thus help in finding the causes of an accident; along with the cockpit voice recorder (CVR), it is part of the flight recorder. The DFDR is often called a 'black box'.

The term "DFDAU" refers to the digital flight data acquisition unit. This device is the processor that feeds the DFDR. Commonly located in the front of the aircraft separate from the DFDR.

The term "IFE" refers to the in-flight entertainment system. This system commonly includes passenger access to various media, in flight WiFi, and shopping options from the aircraft while in flight.

The term "T/M/S" refers to the United States military aircraft designation system standard pertaining to type, model, and series of aircraft. For example, the Boeing 787-8 is a type: Boeing, model: 787, series: 8.

The term "SATCOM" refers to "satellite communication". SATCOM is a system comprised of an artificial satellite constellation and antenna dish ground receivers. This system is used to facilitate telecommunication by reflecting or relaying signals into space and back down to Earth.

The term "ADS-B" refers to automatic dependent surveillance—broadcast. ADS-B is a passive system, which translates GNSS-based signal (GPS) of position data over the RF spectrum. This system is an integral part of the Next Generation Air Transportation System (NextGen). The NextGen system is planned to ultimately replace active radar as the primary means for aircraft tracking and accountability.

The term "OOOI data" refers to times of the actual aircraft movements of Gate Out (O), Wheels Off (O), Wheels On (O), and Gate In (I). This information is critical in building various statistical databases of flights. This information helps in better anticipating scheduling between gates for specific aircraft in specific environments.

The term "UHF" refers to ultra-high frequency. UHF is designated by the International Telecommunication Union (ITU) for radio frequencies in the range between 300 MHz and 3 GHz.

The term "ATC/L-Band" refers to a type of aircraft antenna. This type of antenna is capable of transmitting across the UHF spectrum as defined by the ITU.

The term "flight data" refers to the various parameters fed by multiple sensors across the aircraft from various components. These sensors track status and performance of these components during the course of flight.

The term "VHF" refers to very high frequency (VHF). VHF is designated by the ITU for radio frequencies in the range between 30 MHz and 300 MHz.

The term "electronic flight bag" (EFB) refers to a device that allows flight crews to perform a variety of functions that were traditionally accomplished by using paper references. In its simplest form, an EFB can perform basic flight planning calculations and display a variety of digital documentation, including navigational charts, operations manuals, and aircraft checklists. The most advanced EFBs are fully certified as part of the aircraft avionics system and are integrated with aircraft systems such as the FMS. These advanced systems are also able to display an aircraft's position on navigational charts, depict real-time weather, and perform many complex flight-planning tasks.

The term "air to ground" refers to communication with ground-based receiver networks from an aircraft while in flight.

The term "RF diplexer" refers to a unit that in one application can be used to enable more than one transmitter to operate on a single radio frequency (RF) antenna. The RF antenna diplexer would enable transmitters operating on different frequencies to use the same antenna. In another application, an antenna diplexer may be used to allow a single antenna to be used for transmissions on one band of frequencies and reception on another band.

The term "near real time" refers to the time it takes to collect, broadcast, tailor, and disseminate aircraft data to user(s). This data will be sent to end-user(s) as soon as practical. Real time would presume this data will be retrieved by the end user(s) at the exact time it was created. This time will be slightly offset by the aforementioned.

The term "streaming" refers to the broadcast or transmission of data from the aircraft using the various wireless transmission means available.

Proposed flight data streaming solutions present several, and often-similar challenges. For example, some proposed solutions have focused on the replacement of the DFDR system. This presents a costly alternative and eliminates the redundancy of the already proven DFDR system. Additionally, other propositions include streaming the flight data along with the cockpit voice recorder (CVR) data. The combination of DFDR and CVR data is often too large in size to efficiently transmit over the RF spectrum. Furthermore, streaming in near real time all parameters that the DFDR and CVR collects during normal flight is unnecessary for most aviation industry applications. Lastly many propositions include streaming flight data parameters across costly infrastructure means either by exploiting SATCOM or the VHF spectrum. Both means are very effective means in which to communicate data, but do not offer a cost effective means to transmit data used to justify costs of infrastructure overhead.

Advantageously, the growth and implementation of the NextGen system, which incorporates the use of publicly available ADS-B data broadcast, has inspired third-party entities, such as the flight tracker app (FTA), to create a crowd source-based global community of RF receivers. This development has empowered the spawn of one of the most proliferated infrastructure of aircraft RF communications means in existence. It is thus contemplated, that some embodiments of the present invention may take advantage of this network of in-flight data retrieval, wherein the OCH LRU may empower this community to have the ability to lower data streaming overhead to a point where the aviation industry can take full advantage of existing data broadcast capabilities. Other embodiments, however, may implement or otherwise use new or proprietary crowd sourced data receivers to communicate with the OCH 104 of the present invention.

Reference will now be made to exemplary embodiments illustrated in the drawings, and specific language will be used herein to describe the same. In the description the drawing figures are not necessarily to scale and particular features may be exaggerated in scale, schematic form or generalized in the interest of clarity and conciseness.

Shown in FIG. 1 is a structural diagram of the system embodiment 100 illustrating its various components in relative relation to each other (not to scale) on board an OCH LRU equipped aircraft 102. Primary components of the subject apparatus, the On-board Communications Hub line replaceable unit (OCH LRU) 104 will be integrated in accordance with the present disclosure. The subject OCH LRU 104 of certain embodiments may include a line replaceable unit (LRU) situated in the equipment bay of the equipped aircraft 102.

Many aircraft include Line Replaceable Units (LRU's), which are modular components designed to be replaced quickly without taking the aircraft 102 out of service. The OCH LRU 104 of at least one embodiment may be physically coupled with the digital flight data acquisition unit 106 (DFDAU), which provides a connectivity hub that collects many various inputs from sensors 108 around the equipped aircraft 102. In other embodiments, the OCH LRU 104 may be communicatively interconnected or coupled to the DFDAU 106, the digital flight data recorder 110, and/or the various aircraft sensors 108, in any number of different manners, including physical integration, wireless interconnection, Bluetooth, WiFi, etc.

From the DFDAU 106, avionics data takes two paths. First, during operation of the aircraft, avionics data is automatically and continuously transmitted to the flight data recorder, which is often a digital flight data recorder (DFDR) 110. The DFDR's 110 near indestructability enables later retrieval of the flight data for analysis and investigation in case of a flight incident. The data that is recorded by the DFDR 110 can include parameters that are dictated by the aviation code of federal regulations (CFR) §121.344.

The OCH LRU 104 will passively absorb data and sort with pre-loaded algorithms to automate the process. After the OCH LRU 104 has determined which parameters it will store for future transmission and use, it will broadcast the remainder of the encrypted data via the UHF/L-Band antenna 112 to enable crowd-sourcing retrieval. In the event the OCH LRU 104 senses an exceedance of normal flight or otherwise prompted by the Operations Center (OC) 306, the entirety of bulk data will be broadcasted via either a previously existing, or OCH LRU 104 integrated SATCOM antenna 114.

Figure 3:
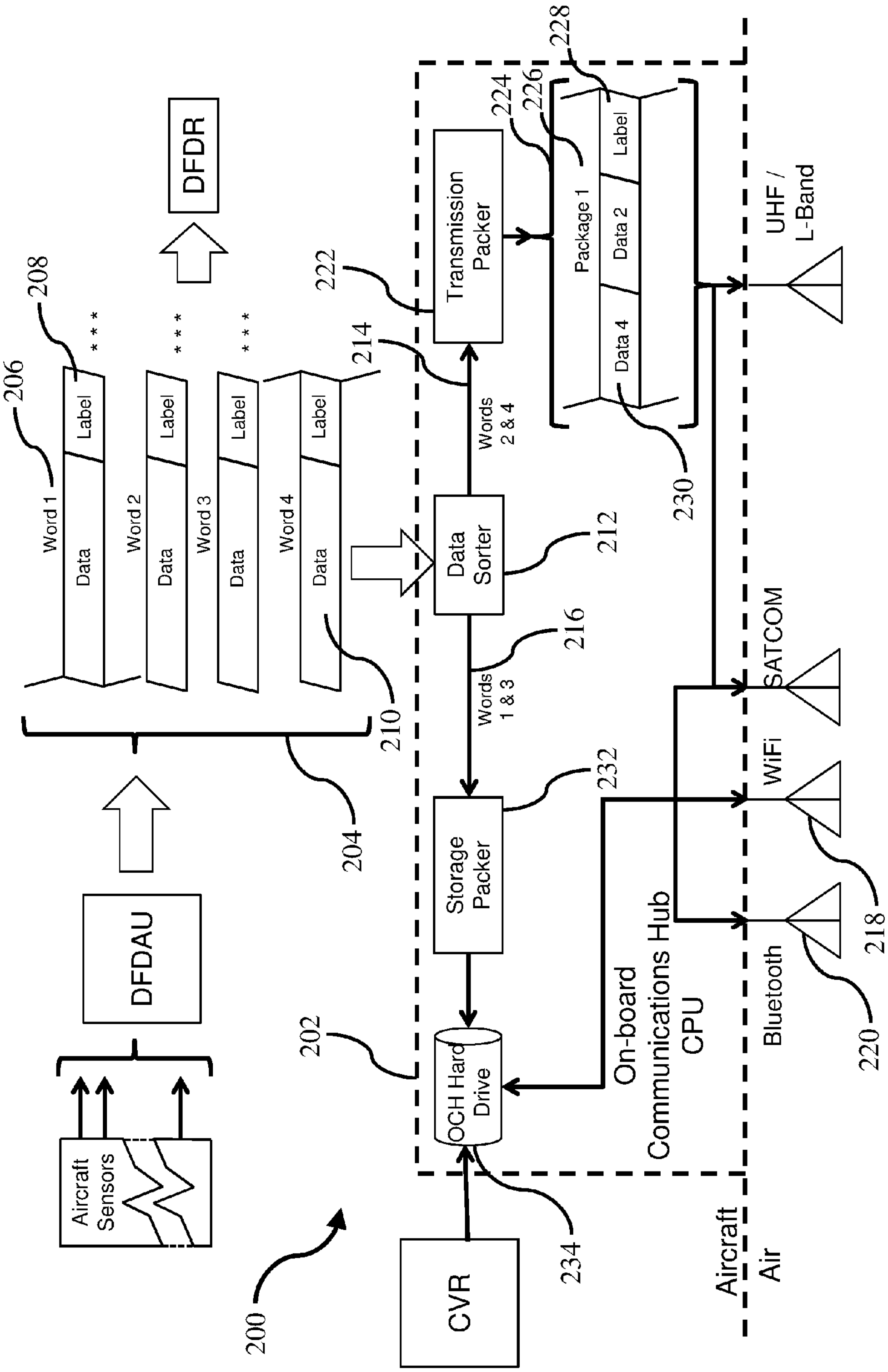
FIG. 3 illustrates a non-limiting diagram outlining how the apparatus will receive, tailor, transmit, and disseminate the aircraft data.

Embodiment referenced by 200 in FIG. 3 examines the processing of aircraft data, as it is transmitted from the various aircraft sensors 108 to the DFDAU 106, and ultimately to the OCH CPU 202 for further interrogation and broadcast using the various means of transmission previously described in the art. The OCH CPU 202 of certain embodiments may be an independently manufactured printed circuit board (PCB) specifically optimized for the OCH LRU 104 and functions as described. The OCH CPU 202 along with certain software and/or hardware modules will perform all data processing. For example, this processing may include, but is not limited to interrogation of incoming signals, to include sorting, scaling, and tailoring of data for either broadcast or storage. Additionally, the OCH CPU 202 will have an organic data storage capability via a hard disk drive (HDD) or other data storage device 234 integrated on or otherwise communicative with the OCH CPU 202.

FIG. 3. illustrates the basic logic of the On-board Communications Hub CPU 202 of the OCH LRU 104 apparatus as the OCH LRU receives, tailors, transmits, and disseminates the data.

In accordance with one exemplary embodiment thereof, aircraft data 204 may be transmitted from the DFDAU 106 in the form of individual words 206. These words 206 are assembled from 32-bit binary. The binary structure in each word 206 is further broken down into a label 208, and the actual data 210, or contents. The label 208 describes the aircraft specific sensor in which it is transmitting from, while the data 210 within the word 206 describes the function of that sensor. The data 210 is further broken down into specific parts irrelevant to the further understanding of this art. As the system operates today, the data 204 is then routed to the DFDR 110 with the possibility of further analysis upon landing and extraction on a limited basis.

In another embodiment, the data 204 is also routed to the OCH CPU 202 and/or the OCH LRU 104. In some embodiments, the OCH LRU 104 includes a data sorting module 212 which may be implemented in the form of software, hardware or a combination of software and hardware. Particularly, the data 204 is sorted using a pre-programmed multiplexer, or data sorting module 212 via the OCH CPU 202. This data sorter 212 automatically determines whether or not the data 204 is critical data 214 or non-critical data 216.

In one embodiment, critical data 214 is that in which the end user(s) previously deems valuable during the time of flight, and thus streamed wirelessly from the aircraft using utilizing UHF/L-Band 112 or SATCOM 114 antenna for transmission.

In another embodiment, non-critical data 216 is that, in which the end user(s) previously deems valuable, but not critical to retrieve until the end of flight using either a WiFi 218 or Bluetooth 220 antenna for wireless transmission.

In another embodiment as illustrated by the example in FIG. 3, data binary words 206 '2' and '4' are deemed critical data 214 parameters by the data sorter 212. This data 214 is then routed to the transmission packer 222. The transmission packer 222 is another computer algorithm within the software suite of the OCH CPU 202. The program in the transmission packer 222 receives the original data format 204 and reformats it, or packages it 224 in a way that optimizes transmission from the OCH CPU 202, and broadcasts it from the aircraft 102 to be received by various means. This new packaged data 224, in this example package 1 226, will consist of a single label 228 followed by the remainder of the data content, or package 230. The remainder of the package 230 following the corresponding label 228 will contain the actual usable critical 214 content to be later enjoyed by the end user(s). The transmission packer 222 will have the additional role of encrypting the data package 224 for security purposes. Lastly, the securely encrypted and optimized data package 224 will be transmitted off of the aircraft using the process illustrated in embodiments 300 and 400. It should be noted that in some embodiments, since the original labels 208 from each of the words 206 may have been stripped or eliminated, for example, via the transmission packer 222, the system and/or method of the present invention may be configured to identify the source of the data 230 by virtue of the order in which it is packaged or via newly created labels optimized for transmission.

In yet another embodiment as illustrated by the example in FIG. 3, data binary words 206 '1' and '3' are deemed non-critical data 216 parameters by the data sorter 212. This data 216 is then routed to the storage packer 232. The storage packer 232, much like the transmission packer 218 is another computer algorithm within the software suite of the OCH CPU 202. The program loaded on the storage packer 232 receives the original data format 204 and reformats it, or packages it in a way that optimizes hard disk storage 234 which resides on the OCH CPU 202. This non-critical data 216 will be later broadcasted from the aircraft following safe landing and taxi to the airport gate using various means of transmission illustrated in embodiments 300 and 400. Furthermore, this data 216 may be used in the event of an emergency, or 'SOS mode' and dumped (mass transmitted) off of the OCH CPU hard drive 234, and thus off of the aircraft completely prior to termination of signal when prompted.

In yet another embodiment illustrated in FIG. 3, CVR data is stored on the OCH Hard Drive 234. CVR data, similar to non-critical DFDAU data, is not transmitted off the aircraft except in the event of an emergency or other trigger as determined by the configuration of the OCH CPU 202. The configuration of the OCH CPU 202 could also determine the number of minutes of CVR audio that should be stored in the hard drive 234.

Figure 4B:
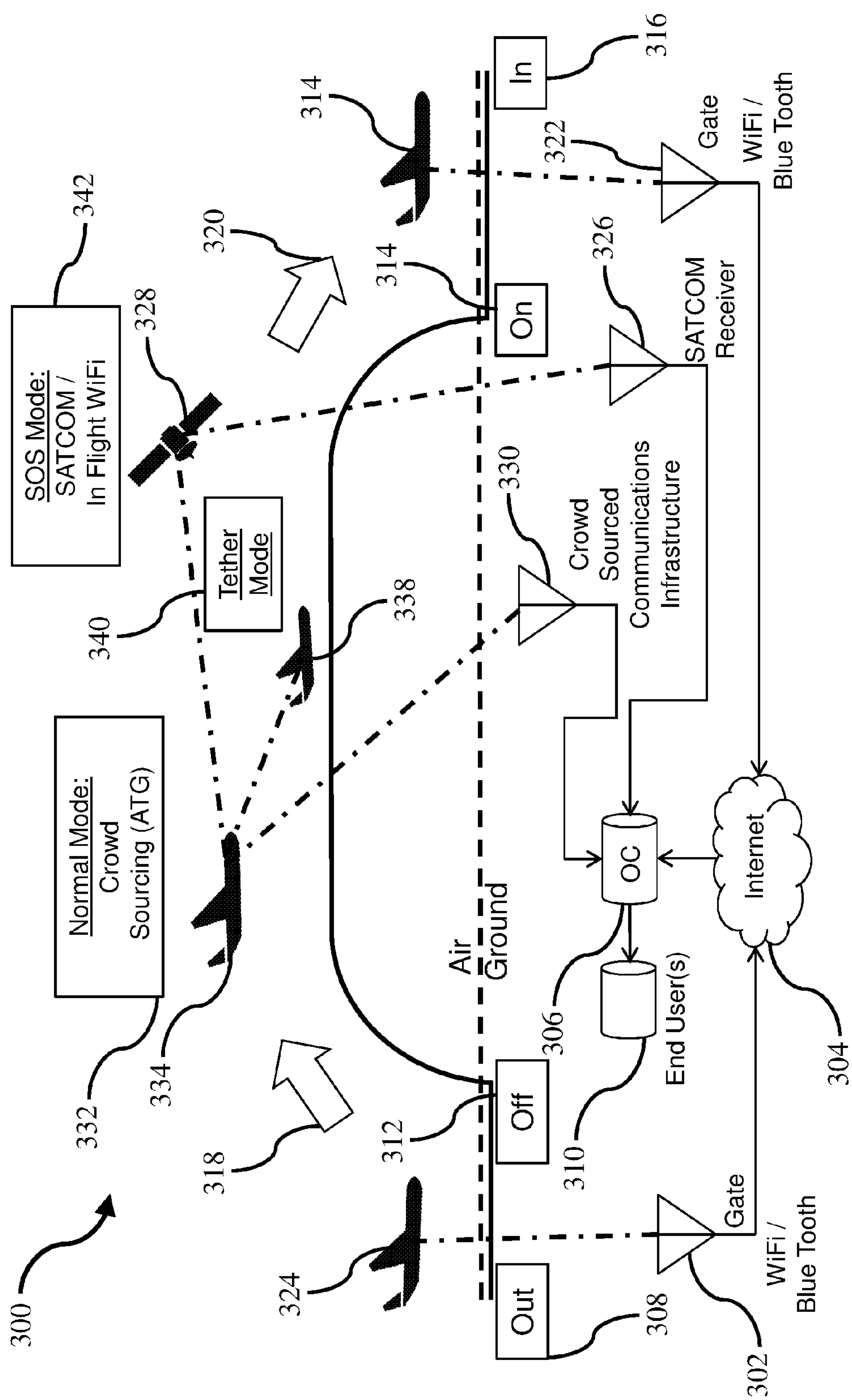
FIG. 4B is another non-limiting functional diagram of at least one embodiment as a holistic system showing the temporal relationships of the individual components of the embodiment throughout the various phases of the flight sequence.

The functional and temporal process diagram of the air-to-ground wireless avionics streaming method 300 taking advantage of the on-board system illustrated in FIG. 1 is provided in FIGS. 4A and 4B. The OCH LRU 104 will have four means of wireless communication (UHF 112, SATCOM 114, WiFi 218, and Bluetooth 220), for example, by virtue of being communicatively interconnected to one or more data transmission device 114, 112, 218. For instance, the data transmission device(s) may be provided by the aircraft itself, or the data transmission device(s) may be provided by the system and method of the present invention, for example, as being part of, integrated with, or communicative with the OCH LRU 104. Each of these transmission capabilities will be best utilized depending which of the various phases of flight the aircraft resides, or a combination thereof.

Prior to flight, and while the aircraft is still at the airport gate, the OCH LRU 104 will be wirelessly connected to the airport WiFi 302 often made available to passengers for personal use. This will be made possible by the WiFi transceiver antenna 218, which is some embodiments may be organic to or otherwise part of the OCH LRU 104. Via the Internet 304, the OC 306 will have the means to communicate to the OCH LRU 104 in order to provide updates and/or change transmission channels in order to free up possible congested bandwidth. These issues may arise if too many aircraft 102 are in the same region equipped with OCH LRU's 104. In order to mitigate this, the OC 306 will automatically 'recognize' congestion and change transmission frequencies as needed. All communications with the OCH LRU 104 will be encrypted and safe from public manipulation and visibility as required and specified by end user(s).

Following departure from the airport gate, the OC 306 will document the exact time the aircraft is 'OUT' 308 from the gate. This indication will be via aircraft sensors 108 responding to aircraft movement and parking brake release.

This data will be sent to the DFDAU 106, and then ultimately to the OCH LRU 104. This data will then be immediately wirelessly transmitted to the OC 306 via WiFi 218 or Bluetooth 220, and forwarded or transmitted to the end-user(s) 310 following data tailoring. This marks one of the four vital stages of the OOOI phases of flight; OUT, OFF, ON, and IN (308, 312, 314, and 316 respectively). In many cases, OOOI data is provided hours, if not days, following completion of the flight. Providing this information in real time or near real time reduces operational costs for the end-user(s) 310, and improves accuracy and timeliness of information flow regarding flight status to the end-user(s) 310 and their customers.

The most likely locations for transmission gaps will be during taxi, takeoff (ascent) 318 and landing (descent) 320. This data will be either wirelessly transmitted, if possible, during flight or when the aircraft 102 reaches its final destination gate 322.

The ascending aircraft 324 is expected to first be within range to wirelessly transmit to receivers approximately 1,000 feet (305 meters) above ground level (AGL). The first data to be transmitted via the OCH LRU 104 will be when the aircraft 102 takes off 324. This represents the 'OFF' 312 sequence of the OOOI data. This is made possible via a sensor on the landing gear assembly, which switches to 'airborne state' once the weight of the aircraft 102 has is transmitted from the ground to the wings. This transmission will either be facilitated using the SATCOM 326, 328 method, or the crowd sourced 330 (via UHF transmission 112) receiver method. The method(s) of wireless transmission in all phases of flight will be end-user(s) 310 dependent, and driven mostly by the end-user(s) 310 willingness to pay for the various data streaming methods available by the OCH LRU 104 apparatus and corresponding system.

Normal mode 332 is defined when the aircraft 102 is technically able to establish constant radio contact with crowd-sourced receivers 330 during stable flight 334. During normal mode 332, the OCH LRU 104 is sorting data it receives from the DFDAU 106, and separates it into critical, and non-critical parameters. Referencing FIG. 3, critical parameters 214 are those deemed by the end-user(s) 310 as packages of data 224, which would serve most useful transmitted from the aircraft 334 in normal flight mode 332. Non-critical parameters 216 are those deemed by the end-user(s) 310 as packages of data, which can wait to be received at a later time. This data holds no value in being retrieved in near real-time. In order to mitigate transmission costs, the primary means of broadcasting critical data parameters 214 will be via UHF 112 transmission of data 224 to the global crowd sourced infrastructure of antennas provided by enthusiasts 330. Data broadcasted for collection by crowd-sourcing 330, will be encrypted using various existing data encryption methodology. This will protect the integrity of end-user'(s) 310 data. In some embodiments, the individual enthusiasts volunteering their antenna receivers 330 for this purpose will have limited access to some data 224 as approved by the end-user(s) 310.

In the embodiment illustrated in FIG. 4A, following collection by the crowd-sourced receivers 330, the data 224 may be automatically, and immediately transmitted to a third party entity, such as, for example, a flight tracker app (FTA) 336 provider. Like the crowd-sourced antenna 330 provider, the FTA provider's 336 computers will automatically, and immediately transmit this data 224 to the OC 306. The OC 306 will then scale and tailor the data 224 into the format the end-user 310 pre-defines.

In other embodiments, however, as shown in FIG. 4B, following collection by the crowd-sourced receivers 330, the data may be automatically and immediately transmitted to the OC 306. In this embodiment, the third party entity is either bypassed or non-existent.

In the event the aircraft 338 is not in range of a crowd-sourced receiver site 330, nor are the end-users 310 willing to pay for SATCOM 326, 328 data transmission, the OCH LRU 104 in some embodiments may have a tethering capability using tether mode as referenced by 340. This allows an aircraft 338 the capability to transmit from its OCH LRU 104 to the OCH LRU 104 on another aircraft 334, for example, another aircraft 334 that is within RF line-of-sight. This wireless tether transmission capability would require the two aircraft (334, 338) to be within UHF RF range, and within physical line-of-sight with one another. The OCH LRU 104 on the receiving aircraft 334 would then either transmit this additional data 224 to the crowd-sourced ground receiver(s) 330, or continue to tether its aircraft 334 data 224, plus the additional data 224 of the initial aircraft 338. This process would continue until the next aircraft 334 is in contact with a crowd-sourced ground receiving station 330. The OCH LRU 104 on-board processor 202 will be capable of rationalizing the various environments and situations, or modes the aircraft 102 could possibly encounter. This algorithm within the OCH CPU 202 will enable the best possible solution for data streaming in every combination of modes thereof.

SATCOM transmission (326, 328) from the OCH LRU 104 can occur in one of two ways: Either by the OCH LRU 104 using its own organic, integrated or provided SATCOM transceiver capability 114, or by integrating into the on-board WiFi 218 service if available by the contracted airline (if utilizing SATCOM to enable WiFi service). The primary use of the OCH LRU 104 organic SATCOM 114 capabilities would be during SOS mode 342. Either one of, or a combination of sensor exceedance on board the equipped aircraft 102, or a prompt by the OC 306 will activate SOS mode 342. For example, if the flight path or activities on board the aircraft are deemed 'suspicious' (e.g. flying off of its planned flight path, hijacking, etc.), the OCH LRU 104 will be prompted to activate SOS mode 342 from the OC 306 via SATCOM 328 communications. Additionally, if the OCH LRU 104 is receiving sensor outputs exceeding pre-programmed thresholds for 'normal flight' 332, the OCH LRU 104 will automatically begin broadcasting all information (bulk data) from the OCH LRU 104 to the available SATCOM satellite 328 until either termination of signal, or prompted to cease by a OC 306 command. SOS mode 342 will not be able to be interrupted, nor deactivated by anyone on board the aircraft 334.

Upon termination of normal flight, the aircraft will log the 'ON' phase 314 of 000I and transmit this time stamp as soon as available. The 'ON' phase 314 will be defined when weight is sensed by the sensor on the landing gear assembly and the aircraft is in 'ground state' 344. This transmission will first become available once the aircraft 344 is at the gate and connected to the gate via Bluetooth 302 or WiFi 322. Lastly, the OCH LRU 104 will log the activation of the parking brake by the flight crew defining the final phase of OOOI, 'IN' 316. Data 214, 216 accumulated and confirmed not transmitted by the OC 306 since termination of active communication during decent 320, will be transmitted from the OCH LRU 104 via the Bluetooth/WiFi capability at the gate 322. This encrypted data 224 will then be sent via the Internet 234 to the OC 306 for eventual routing to the end-user(s) 310.

Alternate streaming methods, again depending on the willingness of the end-user(s) 310 to pay a more premium cost, include SATCOM 324, 328 for normal flight, and WiFi 218 integration in into potential on-board WiFi services among others within the capability of the various communications methods of the OCH LRU 104.

In another embodiment, the OCH LRU 104 will require the installation of a connection cable from the DFDAU 106 to OCH LRU 104, a cable connection from the OCH LRU 104 to an ATC UHF/L-Band antenna 112, and possible RF diplexer(s) to integrate into existing aircraft 102 antenna, and a power supply wire for electrical supply.

As previously described, the various aircraft sensors from around the aircraft 108 will feed both digital and analog sensor data to the DFDAU 106. This data is then forwarded from the DFDAU 106 to the DFDR 110. The OCH LRU 104 will integrate into the data feed transmitted from the DFDAU 106 using the appropriate cable and connection, whether physical or wireless, necessary for integration. This connection type will be pre-fabricated as the kit assembly associated with the specific T/M/S aircraft 102 in which the OCH LRU 104 will be installed. The data from the DFDAU 106 will directly feed into the OCH LRU 104

The primary source of power for the OCH LRU 104 will be from the aircraft's 102 organic power source 402. In addition to this power feed, the OCH LRU 104 will have the option of auxiliary power 402, also organic to the aircraft 102 for power supply 402 in the event of aircraft 102 power disruption and/or failure. Power supply (24V DC) 402 will flow into the OCH LRU 104 and directly into the OCH LRU 104 power adapter 404. From the power adapter 404, various components required to enable the OCH LRU 104 to perform its duties within the aircraft 102 will be supplied necessary power.

In one embodiment, in order for the OCH LRU 104 to accomplish wireless UHF transmission to the crowd-sourced community of receivers 330 as described in embodiment 300, the OCH LRU 104 will require the integration of a UHF/L-Band antenna 112. A UHF modulator 406, within the OCH LRU 104 will enable modulation of digital inputs to RF outputs.

Figure 6:
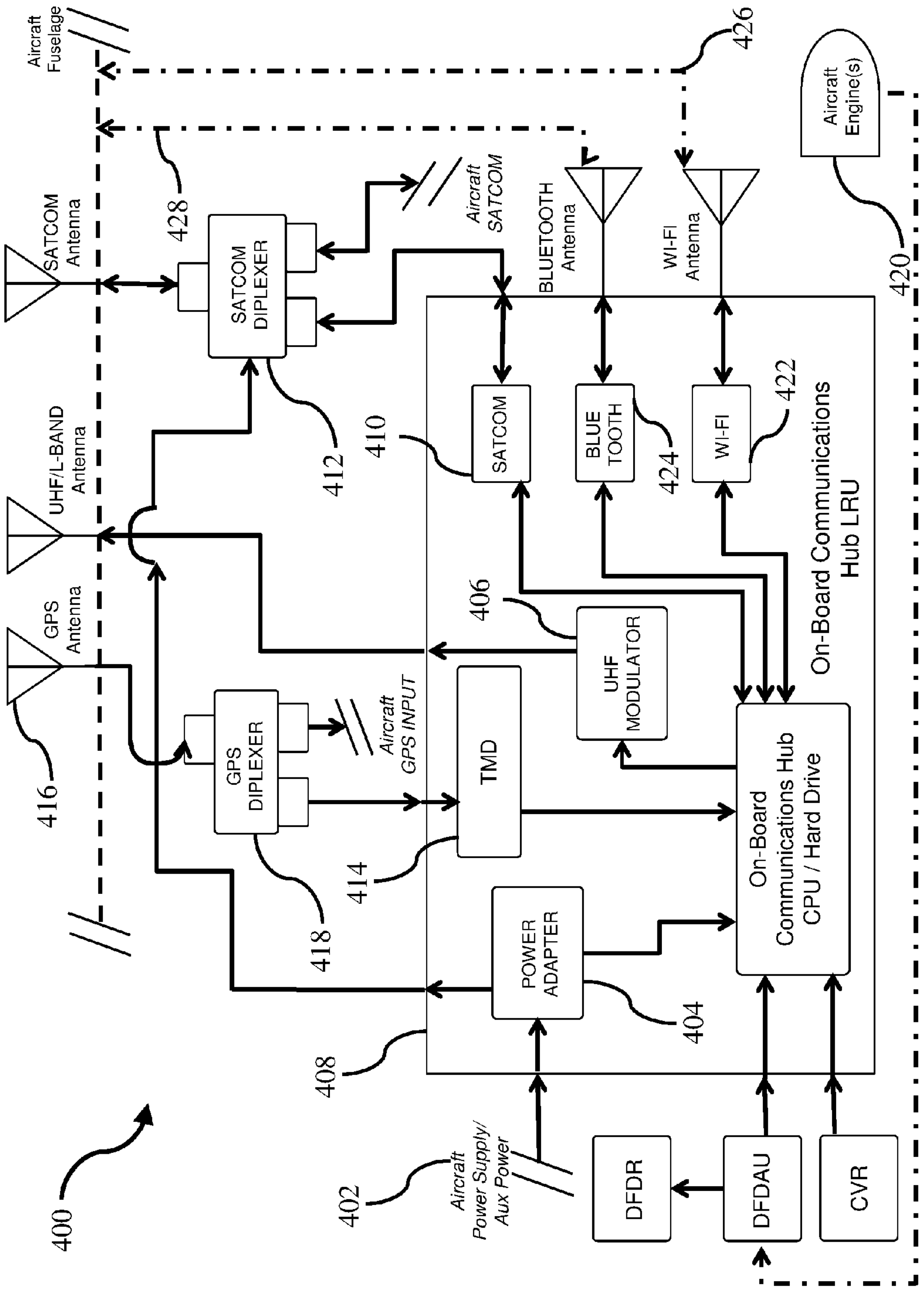
FIG. 6 illustrates a non-limiting diagram of the subject apparatus schematic and its detailed incorporation into the aircraft and the system described in FIG. 1 utilizing the various means of communications available.

In another embodiment, in order for the OCH LRU 104 to perform SATCOM transmission 114 as described in embodiment 300, the OCH LRU 104 will also have within the enclosure 408 of the LRU, a SATCOM modulator 410. In one embodiment, the SATCOM signal following modulation will be transmitted to either a committed SATCOM antenna 114, or integrate into a pre-existing SATCOM antenna 114 is illustrated in embodiment 400 of FIG. 6. A SATCOM diplexer 412 will enable physical integration into said pre-existing aircraft SATCOM antenna 114. The SATCOM diplexer 412 may be provided as an additional component of the OCH LRU 104 installation/assembly kit.

In another embodiment, the OCH LRU 104 will have the capability to recognize its own position in three-dimensional space. This is accomplished by containing, in at least one embodiment within the OCH LRU 104 enclosure 408, a telemetry-monitoring device (TMD) 414. The TMD 414 will include, but not be limited to an electronic micro-accelerometer and gyroscope. Additionally, the TMD 414 will be fed geospatial position information from the pre-existing aircraft GPS antenna 416. The integration into the GPS antenna 416 will be made possible via a GPS diplexer 418, either already installed on the aircraft 102 or as part of the OCH LRU 104 installation kit.

In another embodiment, the OCH LRU 104 will have the additional capability of both communicating to remote aircraft sensors such as aircraft engine(s) 420. This capability will be facilitated by either a wireless connection via WiFi 218 and/or Bluetooth 218 antenna and associated modulators (422 and 424 respectively) within the OCH LRU 104.

In another embodiment, the OCH LRU's 104 organic WiFi antenna 218 and/or Bluetooth antenna 218 transmission capabilities (426, 428) will facilitate bulk wireless aircraft data transmission to receivers located at the airport departure/arrival gates (302, 316) and/or a hand held device by ground maintenance crew personnel.

In another embodiment, the OCH LRU's 104 organic WiFi antenna 218 and/or Bluetooth antenna 218 transmission capabilities (426, 428) will facilitate integration into the flight crew EFB. This will enable transmission of flight crew-tailored data/information to be used for various applications. These applications include, but are not limited to air to ground messaging from the flight crew to the respective airline and/or aircraft controlling stations(s).

In yet another embodiment, the OCH LRU's 104 organic WiFi antenna 218 and/or Bluetooth antenna 218 transmission capabilities (426, 428) will facilitate integration into IFE system. This integration could include, but not be limited to in flight shopping applications, and/or car rental and/or hotel rental reservation applications.

As the aircraft 502 moves through space and time, receiver stations 330 will become increasingly stressed for bandwidth. Additionally, the system or method of certain embodiments of the present invention will be capable of rewarding the individual crowd sourced receiver stations operators 330 with a dividend of the profits gained from the selling of the data in which they provide. These two factors will require both control and accountability of the crowd-sourced 330 network of communications receivers as depicted in FIGS. 7A through 7D.

Figures 7A, 7B, 7C, 7D:
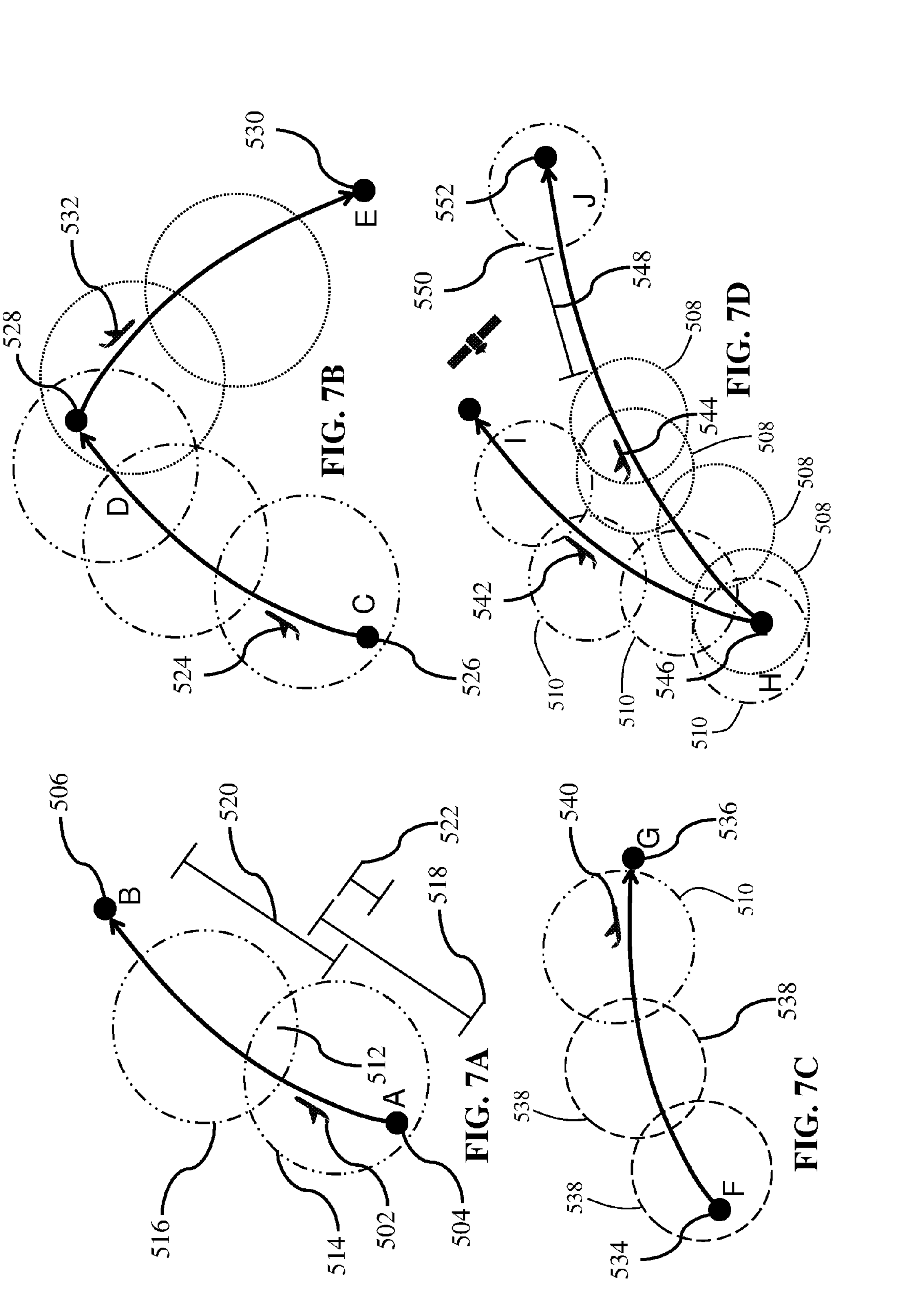
FIGS. 7A, 7B. 7C and 7D illustrate non-limiting examples of some various scenarios in which the OC (and in some embodiments, in coordination with a third party such as a flight tracker app (FTA)) may account for individual receivers within the crowd-sourced receiver network. This accountability will provide a mechanism for deconfliction while also enabling individual owners of the receivers an opportunity to collect rewards (monetary or other) for collecting data used for the purpose described in this art.

FIGS. 7A through 7D depict four exemplary illustrations conceptualizing how the OC 306, (and in some embodiments, along with a third party entity, including, for example, the FTA 336) will deconflict receiver stations while accounting for individual receiver's data rations over a given period in time. In order to make this deconfliction and subsequent synchronization possible, automated and pre-programmed commands will be transmitted to either the individual receivers and to the OCH CPU or OCH LRU 104 at the gate of debarkation 302, for example, via WiFi 218 or Blue Tooth 220 from the OC 306. FIGS. 7A though 7D are not intended to capture all possible instances which may occur. These embodiments merely exemplify the fundamental logic the OC 306, (and in some embodiments, in coordination with the FTA 336) will employ in order to account for and deconflict a global system of crowd sourced receiver units to efficiently receive OCH data while not interfering with the normal reception of ADS-B data.

For example, the operations center (OC) 306 of at least one embodiment includes a transmission channel management module 5306, which may be implemented in software (e.g., using pre-programmed algorithms), hardware, or any combination thereof. For instance, the transmission channel management module 5306 of at least one embodiment is structured to communicate with the OCH 104 in order to define a communication channel or UHF frequency upon which the flight data will be transmitted during in flight operations of the aircraft. In this manner, the transmission device 112 of at least one embodiment (e.g., the UHF/L-Band antenna) may operate over a plurality of frequencies and/or UHF channels, allowing the OC 306 to control or define which channel(s) or frequencies to use at a particular time or during a particular flight.

Accordingly, the transmission channel management module 5306 of at least one embodiment may first analyze flight routes for any one or more aircraft at a given time. If, based upon this information or analysis, the transmission channel management module 5306 determines that there will be or may be congestion (e.g., there may be more aircraft in a particular area at a particular time than a single UHF frequency or channel can optimally handle with respect to the data transfer or transmission disclosed here), then the frequency or channel corresponding to one or more of those aircraft may be changed. In this manner, the OC 306 may send a command to the OCH LRU 104 of a particular aircraft in order to modify or define the UHF frequency or channel upon which to use during a particular flight, during a particular leg of a flight, or during a particular time in flight.

Similarly, at least some of the crowd sourced receivers 330 that are positioned along the flight path must be synchronized to receive data on the changed or modified frequency or channel. Accordingly, in one embodiment the OC 306 may send a command to one or more of the crowd sourced data receivers disposed along the path of the flight in order to change the receiving frequency or channel to match the frequency or channel of the OCH LRU 104 (or the corresponding UHF transmission device 112). In other embodiments, a third party (e.g., FTA) may have control or may be able to send commands to the crowd sourced data receivers 330. In such a case, the FTA or other third party may be the entity or system that sends commands to the individual crowd sourced data receivers 330 in order to synchronize the crowd sourced data receivers 330 with the transmission device or frequency/channel of one or more aircraft.

In one example, as shown in FIG. 7A, the hypothetical aircraft 502 travels from location A 504 to location B 506. This illustrates an example of a simple flight route in order to demonstrate handover and accountability. The dashed circles 508 represent a one hypothetical UHF frequency carrier (968 MHz), while the solid circles 510 represent a second hypothetical frequency carrier (1115 MHz). It should be noted that the system and method of certain embodiments of the present invention may utilize one or more frequencies within the UHF frequency allocation for aeronautical radio navigation (e.g., 960 MHz-1215 MHz). The frequencies chosen for the following examples are for demonstration purposes only and are not indicative of the actual frequencies the system and method may use.

In the illustrated example shown in FIG. 7A, the OCH 104 on board the equipped aircraft 502, is preprogrammed to transmit at the same frequency or channel (e.g., via 1115 MHz) throughout the entire journey from location A 504 to B 506. This pre-programmed transmission frequency is validated and assigned to the OCH CPU or OCH LRU at the point of departure 504 via WiFi 332 (or other) connection to the OCH LRU, for example, from the OC. Additionally, the crowd-sourced receiver channel is assigned to receive on this same frequency in automated coordination with (ICW) both the OC 306 (and, in some embodiments, a third party, such as the FTA 336, as described above). If the channels must be modified in order to synchronize with a passing aircraft, the OC 306 (and/or the FTA 336) will transmit a simultaneous demand to both the OCH CPU or OCH LRU and at least some of the crowd-sourced receivers en route 330 of the OCH equipped aircraft 502 to synchronize the same transmission and receiving channels respectively.

As the OCH equipped aircraft 502 travels from one receiver to another (the communications handoff zone 512), the data will be duplicated. This duplicated data will be used in order to validate both data sets to the OC 306 (and in some cases, the FTA 336). IN some embodiments, following termination of active signal from the first receiver 514 to the second 516, the first receiver 514 will be placed once again on OCH stand by mode (receiver normal mode) and continue to receive and transmit ADS-B telemetry data (for example, to the FTA 336). Following the completion of the flight, the FTA 336 will submit to the OC 306 the amount of data received and provided by each of the receivers en route (518 and 520 respectively). Otherwise, in the embodiments without use of the FTA, the OC 306 will simply compile or store the data for use or transmission to the end user. Data overlap during handoffs 522 will be accounted for the equal weighted fraction of data provided during this time 512 (e.g. 50/50 between 2 receivers, etc.). In some embodiments, the OC 306 will, at the end of a predetermined period, account for the proprietary gain by the company from that route and provide a dividend to each of the receiver owners whose receivers provided this data 514, 516 thus rewarding them with a pre-determined monetary 'reward' for their contribution.

In yet another embodiment illustrated in FIG. 7B, the OCH equipped aircraft 524 is flying a hypothetical two-leg route from point C 526 to D 528, followed by E 530. As the OCH equipped aircraft 524 proceeds from point C 526 to D 528, accountability and handoff proceeds as described in the previous example. However, due to an identified point of confliction in either channel or bandwidth, it is determined within this example that the channel used on the first leg from C to D (e.g., channel 1115 MHz) will no longer support this data transfer during the second leg from point D 528 to E 530 for various reasons. Accordingly, this channel must be switched to another channel (e.g., from 1115 MHz to 968 MHz). This is shown in the Figure with different dashed lines. The command to change the frequency or channel will be transmitted to the aircraft from the OC 306 via the departure gate 302, and eventually to the OCH CPU 202 or OCH LRU 104 on board the OCH enabled aircraft 532. The OCH CPU 202 or OCH LRU 104 will then switch its transmission signal (e.g., from 1115 MHz to 969 MHz) for the second leg of the trip. Furthermore, a signal or command will be transmitted to some or all of the receivers that fall within the second leg (e.g., from D to E) of the OCH equipped aircraft 532 in order to switch and synchronize the receiving channels (e.g., switch to 968 MHz). Again, this command may originate from the OC 306, a third party (e.g., the FTA) or another entity or location. This accuracy of exactly when the receivers should switch channels will be further validated by the OOOI data transmitted from said aircraft (524 and 532).

In yet another example illustrated in FIG. 7C, the route from hypothetical point of departure F 534 to arrival point G 536 demonstrates the automated system of receivers switching from receiver normal mode to OCH collection mode. 'Normal receiver mode' may be defined as the collection of ADS-B only information from aircraft not equipped with the OCH via the federally mandated frequency of 1090 MHz. In addition to 978 MHz, the FAA and other international aviation governing bodies mandate 1090 MHz 538 as the carrier channel exclusively to be used for the used ADS-B. As the aircraft departs the various receiver ranges, in some embodiments, the receivers may switch back to the original normal receiver mode channel of 1090 MHz 538 in order to continue to passively retrieve ADS-B transmissions from non-OCH equipped aircraft. The receivers forward of the flight path and within the range of the OCH equipped aircraft 540 will remain on the pre-designated channel 510 in preparation to receive OCH data.

In order to enable a receiver, which has switched receiving channels from 1090 MHz 538 to another pre-designated optimized channel for OCH CPU reception to continue to collect ADS-B data, the ADS-B data will supplement the data transmitted from the OCH CPU bundling all data together. This will allow for zero-loss in the data collection capability of the individual receivers as they populate the FTA 336 common operating picture (COP), and the OCs 336 ability to accumulate data seamlessly for distribution to the various end-users 310.

In yet another example illustrated in FIG. 7D, there may be an instance where the multiple OCH equipped aircraft 542 544 either depart a common point of origin 546, or transverse through a common geographical region simultaneously. In order to mitigate this, OC 306, for example, via the transmission channel management module 5306 described above (and in some cases the FTA) will anticipate the conflict automatically ahead of time. A command will be sent to the crowd sourced receivers in order to deconflict receiver channels, while the OC 306 will deconflict transmission channels via WiFi/Blue tooth 218/220 at the gate(s) 302 as previously described. For example, within a region of competing receiver priorities, a portion of the receivers in the area will receive on one channel (e.g. 1115 MHz 510), while the other portion will receive on another channel (e.g., 968 MHz 508). The OCH equipped aircraft (542 and 544 respectively) will synchronize to this system by transmitting on said frequencies. In the event an aircraft is completely out of range of ATG transmission options 548, the OC 306 will send a command to the OCH equipped aircraft 544 to either prompt tether mode 340 or SATCOM mode 342. Tether mode 340 and/or SATCOM mode 342 will terminate upon first contact with the next ATG receiver station 550 en route to its final location 552.

In yet another embodiment, if an OCH CPU 202 equipped aircraft declares an emergency, or if any other pre-defined manual or automated trigger occurs, as the define in the configuration of the OCH CPU 202, the OCH CPU 202 will transition from its normal mode of operation and transmit all data received from the DFDAU on all communications channels available on the aircraft (SATCOM, Radio, WiFi). Furthermore, the OCH CPU 202 will reset the Data Sorter 212 to act as a pass-through device, and will start transmitting live CVR data. Additionally, the OCH CPU 202 will attempt, based on bandwidth availability, to transmit previously stored CVR data, as well as previously stored non-critical DFDAU. On the ground, in order to minimize interference and insure all data is received with integrity, the OC 306 will reconfigure receivers that are on the path of said aircraft to tune to its corresponding transmission frequency. Additionally, the OC 306 will send commands to all OCH CPU 202 available on aircrafts in the vicinity to cease their transmissions or switch to alternate frequencies, further easing congestion on the radio spectrum.

Figure 8:
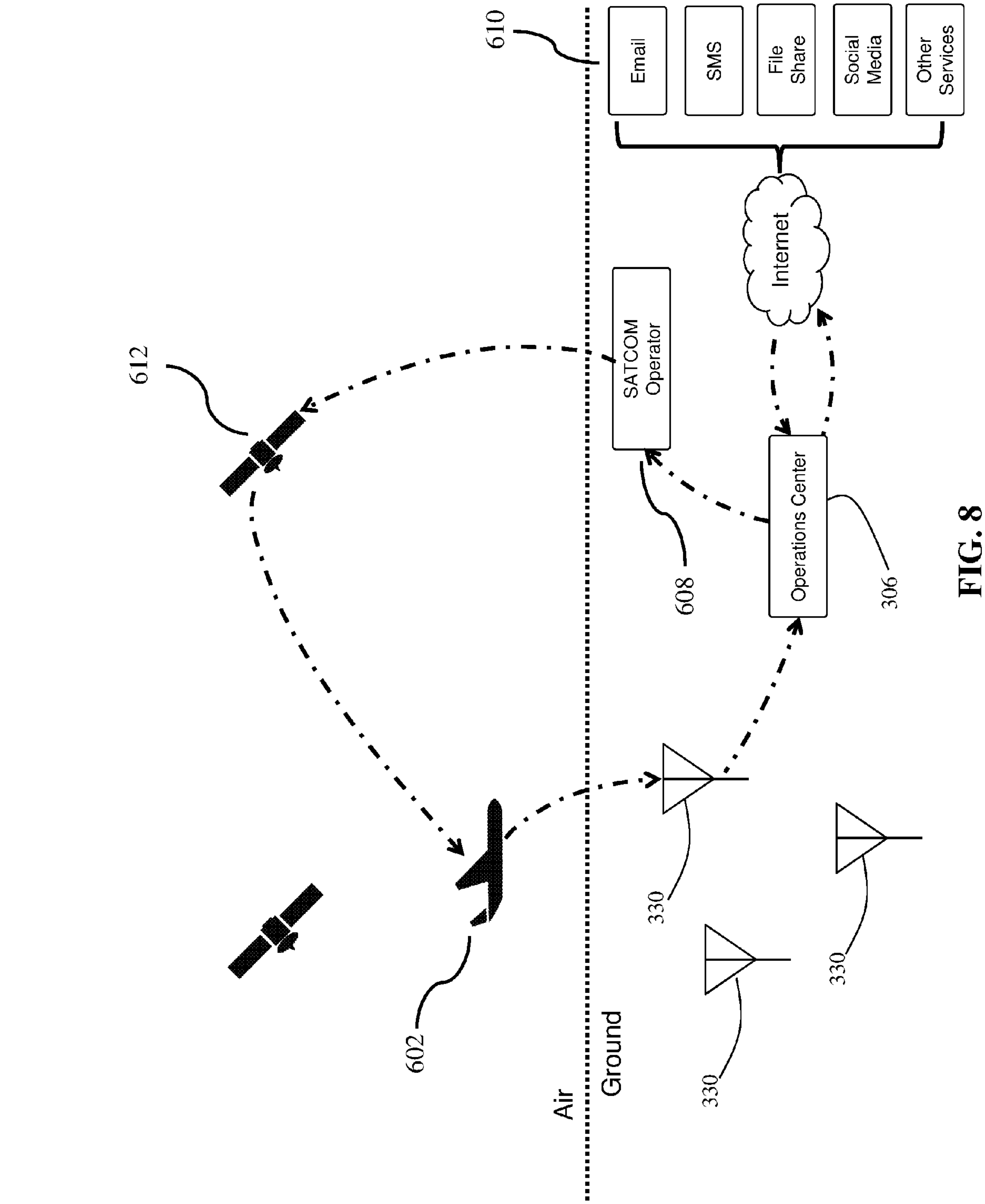
FIG. 8 illustrates a non-limiting embodiment that demonstrates how the outbound portion of an Internet connection could be re-routed through the network of crowd-sourced receivers.

In an embodiment illustrated in FIG. 8, outbound Internet traffic originated by a passenger is routed through the system of the present invention, providing a more affordable data pathway from the aircraft 602 to the Internet through the crowd sourced ground receivers 330. This solution enables aircraft operators to significantly save on data traffic fees, especially when users initiate data-intensive outbound operations, such as sending emails with large attachments, uploading a file to the cloud, sending a message MMS, or posting a picture or video to a social media site, among others, as generally shown at 610.

For instance, the OCH CPU 202 and/or OCH LRU 104 will participate actively in executing such operations, where it the will detect a user request and reformat it to create a command that will be processed by the OC 306. In such an embodiment, the OC 306 may include an Internet traffic routing module 6306 (FIG. 5) for receiving Internet traffic communications from the crowd sourced data receivers 330 and for routing the Internet traffic communications to the appropriate source via the Internet, as shown at 610. For instance, based on the nature of the request, the OC 306 will re-route the request, data or information to the appropriate service on the ground, essentially acting as a proxy. In the event where the request processed by the OC 306 requires feedback to the end-user, the OC 306 will intercept that feedback and forward it through a SATCOM operator 608. This feedback will reach the user after going through the proper constellation satellite 612, which will in turn forward it to the OCH CPU 202 or OCH LRU 104. The OCH CPU or OCH LRU 104 is responsible to finally deliver the feedback to the passenger.

In yet another embodiment, the passengers on the aircraft could be provided with a proprietary interface, in the form of a desktop application, mobile application or other, that will communicate directly with the OCH CPU 202 or OCH LRU 104 to send commands to the ground network of crowd-sourced receivers. For instance, in some embodiments, the OCH LRU 104 may include an on-board Internet traffic module 5104 (FIG. 2), which may be software, hardware or a combination thereof, configured to receive an Internet request or communication, for example, from an interface (e.g., desktop interface, laptop interface, mobile application), and transmit that request, date or information to the OC 306 via the plurality of crowd sourced data receivers 330. Such an interface would be designed specifically to expect no real-time feedback, therefore not requiring any real-time response from the service it targeted. This provides additional savings by eliminating the use of any SATCOM bandwidth.

Figure 9:
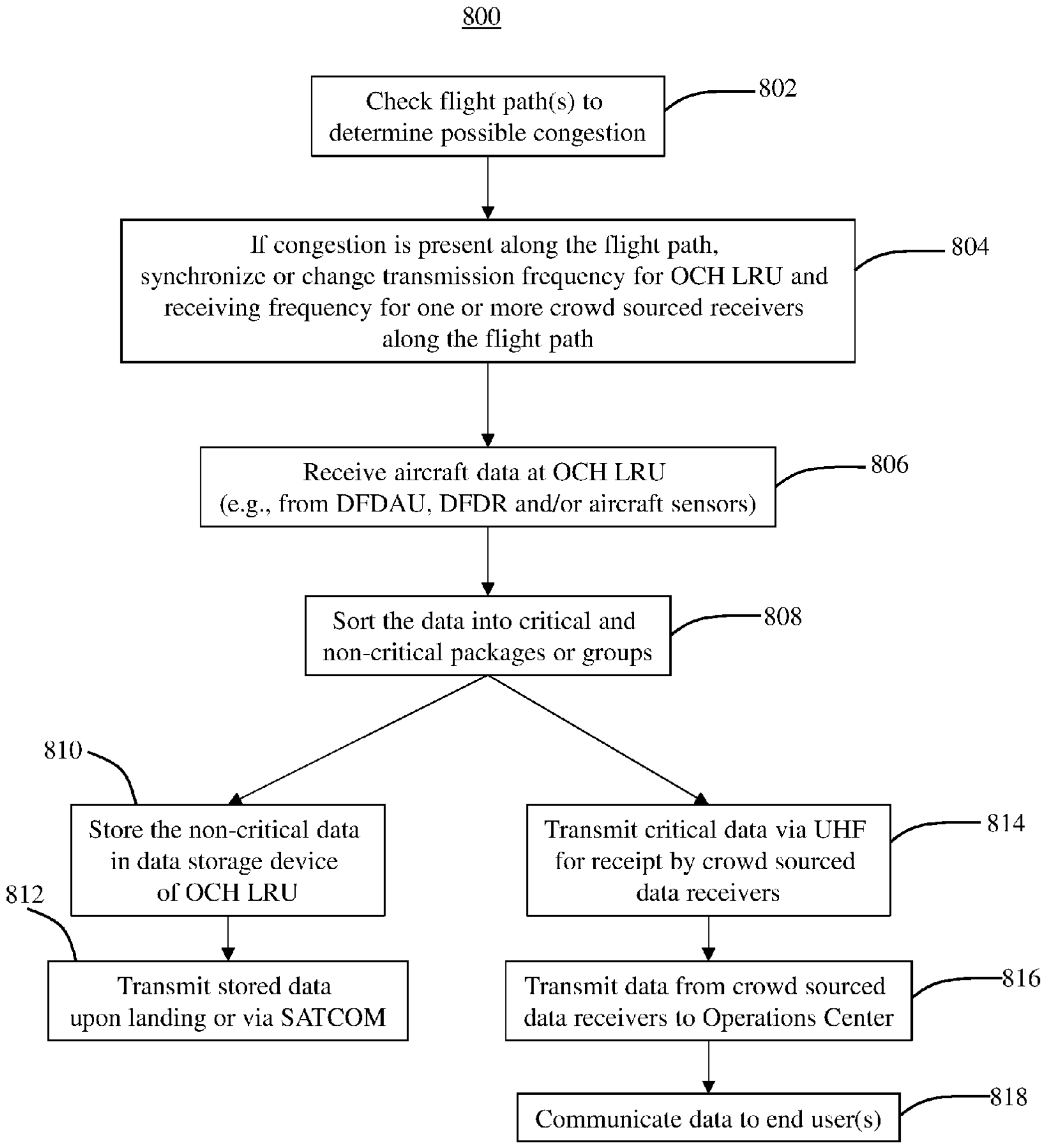
FIG. 9 is a high level flow chart illustrating the method of at least one embodiment of the present invention.

With reference to FIG. 9, the present disclosure further includes a method 800 for the collection and transmission of aircraft data using a plurality of crowd sourced data receivers, and in some instances, for implementing one or more of the various features of the system as described herein. FIG. 9 illustrates an exemplary, high level flow chart for some of the features included in the method 800 of one embodiment, although FIG. 9 should not be deemed limiting in that other features may be included in order to implement the system described herein, and some of the features included may be eliminated.

In any event, as shown at 802 in FIG. 9, the method 800 of at least one embodiment include checking the flight path of a given aircraft in order to determine if there is or will be possible congestion during the flight. Congestion may be interpreted as too many flights in a given area at a given time such that data transmissions (e.g., UHF transmissions) may not be possible or may be strained if provided on a single channel or frequency. This check may be performed by the OC at regular intervals, prior to each flight, or periodically, and may be based upon predetermined flight information such as the time of flight and estimated or projected flight path.

If congestion is present or estimated, then, as shown at 804, the transmission frequencies for both the OCH and at least some of the crowd sourced receivers positioned along the flight path may be synchronized to operate at a different frequency or channel. For instance, as provided above, the OC may send a command to the OCH LRU or OCH CPU in order to change the transmission frequency for a given flight or during a particular time. Similarly, the OC may send a command to the crowd sourced data receivers positioned along the flight path to adjust or change the receiving frequency during a particular time, for instance, during the particular flight. In other embodiments, as described herein, a third party such as the FTA may send a command to the crowd sourced data receivers regarding the change of receiving transmission frequency.

With the transmission and receiving frequencies synchronized, while the aircraft is in flight, the method 800 further includes receiving 806 aircraft data at an on-board communication hub (OCH), for example, from a digital flight data acquisition unit (DFDAU), digital flight data recorder (DFDR), and/or various sensors positioned throughout the aircraft. As provided above, as shown at 808, the received data may be sorted (e.g., via a data sorting module) into critical and non-critical packets or groups. The non-critical data (e.g., information that is determined to be important but not needed in near real time) may be stored 810 for later retrieval, for example, in the data storage device of the OCH LRU 104 and/or via the DFDR. The information or data stored in the OCH LRU data storage device may then be subsequently transmitted 812 to the OC, for example, via WiFi, BlueTooth, SATCOM or other transmission means. Typically, the non-critical data may be transmitted via the Internet upon landing or when the OCH LRU can establish a WiFi connection with the gate.

As provide herein, and as shown at 814 and 816, the critical data is transmitted to the OC 306 via the plurality of crowd sourced data receivers 330 in near real time during in-flight operations of the aircraft, for example, via UHF transmission channels or frequencies. Once the OC 306 receives the data or information from the plurality of crowd sourced data receivers 330, the OC 306 may compile the data, eliminate redundancies (if any), and format the data or information for transmission to the end user or customer, as shown at 818.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains. All features and embodiments disclosed and claimed herein can be prepared and executed without undue experimentation in light of the present disclosure.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A system for using a plurality of crowd-sourced data receivers to relay flight data from an aircraft to an operations center, the plurality of crowd-sourced data receivers collectively creating a ground-based collection of receivers disposed along a flight path of the aircraft, said system comprising:

an on-board communication hub communicatively interconnected to a digital flight data acquisition unit of an aircraft, said on-board communication hub comprising a computer processor, memory and a data storage device, said on-board communication hub comprising a data sorting module structured to receive flight data from the digital flight data acquisition unit, said data sorting module further structured to select a critical portion of the flight data for near real-time transmission to the plurality of crowd-sourced data receivers, said on-board communication hub being communicatively interconnected to at least one radio-frequency data transmission device for transmitting said selected critical portion of said flight data during in-flight operations of the aircraft for receipt by at least some of the plurality of crowd-sourced data receivers disposed in range for radio-frequency communication, wherein the plurality of crowd-sourced data receivers are capable of interpreting only a limited amount of said critical portion of said flight data, wherein all of said critical portion of said flight data communicated to the crowd-sourced data receivers is relayed to the operations center.

2. The system as recited in claim 1 wherein said on-board communication hub is communicatively interconnected to a plurality of data transmission devices for transmission of the flight data to said operations center.

3. The system as recited in claim 2 wherein said on-board communication hub is structured to transmit the flight data via a different one of said plurality of data transmission devices based upon a location of the aircraft.

4. The system as recited in claim 3 wherein said plurality of data transmission devices comprise an ultra-high frequency (UHF) data communication device and a satellite communication (SATCOM) device.

5. The system as recited in claim 4 wherein said plurality of data transmission devices further comprise a WiFi communication device.

6. The system as recited in claim 1 wherein the on-board communication hub and the plurality of crowd-sourced data receivers disposed along the flight path of the aircraft are synchronized to a common ultra-high frequency (UHF) communication channel via a command provided by the operations center prior to departure of the aircraft on the flight path.

7. The system as recited in claim 6 wherein said data transmission device is structured to communicate the flight data via a plurality of UHF communication channels.

8. The system as recited in claim 7 wherein said operations center comprises a transmission channel management module structured to communicate with said on-board communication hub prior to departure of the aircraft on the flight path to define the UHF communication channel which said at least one radio frequency data transmission device will transmit the flight data to the plurality of crowd-sourced data receivers disposed in range for radio communication along the flight path via in-flight operations.

9. The system as recited in claim 8 wherein said transmission channel management module of the operations center is further structured to communicate with the plurality of crowd-sourced data receivers disposed in range for radio communication along the flight path to define a receiving UHF communication channel that will receive the flight data from the at least one radio frequency data transmission device while the aircraft is in-flight and in range.

10. The system as recited in claim 1 further comprising an on-board Internet traffic module for receiving Internet traffic communications from a user and transmitting the Internet traffic communications to said operations center via the plurality of crowd-sourced data receivers during in-flight operations of the aircraft.

11. The system as recited in claim 10 wherein said operations center comprises an Internet traffic routing module for receiving the Internet traffic communications from the plurality of crowd-sourced data receivers and for routing the Internet traffic communications to the appropriate service via the Internet.

12. A method for the collection and transmission of aircraft data using a plurality of crowd-sourced data receivers collectively creating a ground-based collection of receivers disposed along a flight path of the aircraft, the method comprising: prior to departure of the aircraft along the flight path, defining at least one radio communication channel for a radio communication device to use during in-flight operations of the aircraft, the radio communication device being disposed on the aircraft and in communication with an on-board communication hub, synchronizing at least some of the crowd-sourced data receivers to operate on the at least one radio communication channel so that the synchronized crowd-sourced data receivers will communicate with the radio communication device on the aircraft when the aircraft and the synchronized crowd-sourced data receivers are in range with one another for radio communications, during in flight operations of the aircraft, receiving the aircraft data via an on-board communication hub, the on-board communication hub comprising a computer processor, memory and a data storage device, during in flight operations of the aircraft, transmitting at least a portion of the aircraft data to at least some of the synchronized crowd-sourced data receivers disposed in range for radiofrequency communication via the radio communication device, communicating the transmitted aircraft data from the plurality of crowd-sourced data receivers to an operations center, the operations center comprising a computer processor, memory and a data storage device, and communicating the received aircraft data at the operations center to at least one end user.

13. The method as recited in claim 12 wherein the radio communication device is structured to operate data transmissions via a plurality of transmission frequencies, and wherein the plurality of crowd-sourced data receivers are structured to receive transmitted data via a plurality of transmission frequencies.

14. The method as recited in claim 12 further comprising determining a projected flight path of the aircraft prior to in-flight operations of the aircraft, determining a projected flight path of at least one other aircraft, and, based thereupon, if a bandwidth congestion is determined, operating the radio communication device on the aircraft at a first transmission frequency during in-flight operations, and operating the radio communication device on the other aircraft at a second, different transmission frequency during in-flight operations.

15. The method as recited in claim 12 comprising receiving Internet traffic communications from a user via an on-board Internet traffic module.

16. The method as recited in claim 15 further comprising transmitting the Internet traffic communications to the operations center via the plurality of crowd-sourced data receivers during in-flight operations of the aircraft via the ultra-high frequency data communication device.

17. The method as recited in claim 16 further comprising receiving the Internet traffic communications at the operations center and routing the Internet traffic communications to an appropriate source via the Internet.

18. A system for using a plurality of crowd-sourced data receivers to relay flight data from an aircraft to an operations center, said system comprising:

an on-board communication hub communicatively interconnected to a digital flight data acquisition unit of an aircraft, said on-board communication hub comprising a computer processor, memory and a data storage device, said on-board communication hub being communicatively interconnected to at least one radio-frequency data transmission device for transmitting at least a portion of said flight data during in-flight operations of the aircraft for receipt by at least some of the plurality of crowd-sourced data receivers disposed in range for radio-frequency communication, wherein the plurality of crowd-sourced data receivers define a ground-based collection of receivers disposed along a flight path of the aircraft, wherein as the aircraft travels along the flight path, some of the plurality of crowd-sourced data receivers will come into range for radio communication with the aircraft and other ones of the plurality of crowd-sourced data receivers will go out of range for radio communication with the aircraft, and wherein said plurality of crowd-sourced data receivers are structured to communicate the flight data received from the on-board communication hub to an operations center.

* * * * *